(12) United States Patent
Tapio

(10) Patent No.: US 10,479,448 B2
(45) Date of Patent: Nov. 19, 2019

(54) SNOWMOBILE HAVING A SNOW GUARD

(71) Applicant: BRP FINLAND Oy, Rovaniemi (FI)

(72) Inventor: Janne Tapio, Saarenkyla (FI)

(73) Assignee: BRP FINLAND OY, Rovaniemi (FI)

( * ) Notice: Subject to any disclaimer, the term of this patent is extended or adjusted under 35 U.S.C. 154(b) by 116 days.

(21) Appl. No.: 15/705,490

(22) Filed: Sep. 15, 2017

(65) Prior Publication Data

US 2019/0084607 A1   Mar. 21, 2019

(51) Int. Cl.
| | |
|---|---|
| *B62M 27/02* | (2006.01) |
| *B62D 55/07* | (2006.01) |
| *B62D 55/088* | (2006.01) |
| *B62D 25/16* | (2006.01) |

(52) U.S. Cl.
CPC .......... *B62M 27/02* (2013.01); *B62D 55/07* (2013.01); *B62D 55/088* (2013.01); *B62D 25/16* (2013.01); *B62M 2027/028* (2013.01)

(58) Field of Classification Search
CPC ..................... B62M 27/02; B62M 2027/028
See application file for complete search history.

(56) References Cited

U.S. PATENT DOCUMENTS

| | | | | | |
|---|---|---|---|---|---|
| 4,418,782 | A * | 12/1983 | Nakazima | ............. | B62M 27/02 180/182 |
| D328,575 | S * | 8/1992 | Berto | ............................... | D12/7 |
| 5,611,572 | A * | 3/1997 | Alava | .................. | B62D 25/168 180/184 |
| 6,491,125 | B2 * | 12/2002 | Girouard | .................. | B62J 35/00 180/190 |
| 6,698,111 | B2 * | 3/2004 | Lela | ........................ | A63C 19/10 37/219 |
| 7,779,944 | B2 * | 8/2010 | Bergman | ............... | B60K 11/04 180/190 |
| 8,490,731 | B2 * | 7/2013 | Eaton | ..................... | B60K 28/00 180/190 |
| 2017/0158046 | A1 | 6/2017 | Vezina et al. | | |

OTHER PUBLICATIONS

AD Boivin Design; Snow-Hawk 800 HO 2007 Shop Manual; Jun. 6, 2007; cover pages and pp. 12-9, 12-10, 12-23 and 12-24; Lévis; Canada.

(Continued)

*Primary Examiner* — Kevin Hurley
(74) *Attorney, Agent, or Firm* — BCF LLP

(57) ABSTRACT

A snowmobile has a frame having a tunnel; at least one ski operatively connected to the frame; a motor supported by the frame; an endless drive track disposed at least in part below the tunnel and operatively connected to the motor for propulsion of the snowmobile; a suspension assembly operatively connected to the frame, the suspension assembly supporting and tensioning the endless drive track, the suspension assembly having a least one rear idler wheel, the at least one idler wheel defining an idler wheel rotation axis; and a snow guard connected to the suspension assembly. The snow guard has a deflector. The deflector has a leading edge and a trailing edge. The leading edge is rearward and upward of the idler wheel rotation axis. The trailing edge is rearward and upward of the idler wheel rotation axis.

29 Claims, 12 Drawing Sheets

(56) References Cited

OTHER PUBLICATIONS

American Snowmobiler Magazine; Proto suspension ride; Mar. 16, 2007; retrieved from http://www.amsnow.com/news/snowmobile-news/2007/03/proto-suspension-ride on Oct. 19, 2016.
Sledjunkie; Snowhawk Rock!!!; Apr. 27, 2010; retrieved from http://www.sledjunkie.com/showthread.php?2341-Snowhawk-Rock on Sep. 14, 2017.
SnoWest Magazine; SnoWest Snowmobile Forum; Jul. 22, 2010; Harris Publishing Inc.; retrieved from https://www.snowest.com/forum/showthread.php?t=220452 on Sep. 14, 2017.

* cited by examiner

SNOWMOBILE HAVING A SNOW GUARD

FIELD OF TECHNOLOGY

The present technology relates to snowmobiles having a snow guard.

BACKGROUND

Snowmobiles are propelled by endless drive tracks. As a snowmobile moves forward over snow, the endless drive track projects snow rearward. To reduce the amount of snow being projected rearward, some snowmobiles are provided with a snow flap connected to the rear of a tunnel of the snowmobile and extend downward therefrom. As a result, at least some of the snow being projected by the endless drive track is blocked by the snow flap.

Some snowmobiles use a liquid cooling system to cool components such as the engine for example. To cool the coolant flowing in the liquid cooling system, the tunnel of some of these snowmobiles have a heat exchanger assembly. Although the cold weather in which snowmobiles operate assist in cooling the coolant flowing in these heat exchanger assemblies, the snow flaps on these snowmobiles have been shaped to not only block the snow projected by the endless drive track, but to redirect this snow onto the heat exchanger assemblies. The contact between the snow and the heat exchanger assemblies provided in the tunnels improves the cooling of the coolant flowing in these heat exchanger assemblies. In order to increase the amount of snow being redirected toward the heat exchanger assemblies in the tunnels, the snow flaps have been made longer.

FIG. 1 illustrates the tunnel 100, suspension assembly 102, endless drive track 104 and snow flap 106 of a snowmobile of the type described above. As can be seen, the snow flap 106 is connected to the rear end of the tunnel 100 and extends downward therefrom. As can also be seen, the snow flap 106 is long enough that, in the illustrated position of the suspension assembly 102, the lower portion of the snow flap 106 is located behind the rear idler wheels 108 of the rear suspension assembly 102. As a result, most of the snow projected by the endless drive track 104 as the snowmobile moves forward hits the snow flap 106 and a portion is redirected toward the heat exchanger assembly (not shown) provided in the horizontal central section of the tunnel 100.

Although effective to redirect snow toward the heat exchanger assembly, the use of the flap 106 has the drawback that as the suspension assembly 102 extends and compresses, the vertical position of the rear idler wheels 108 relative to the lower end of the snow flap 106 varies. As a result, the amount of snow deflected by the snow flap 106 varies depending on the position of suspension assembly.

Another drawback of the use of the snow flap 106 is that, in the event that the snowmobile moves in reverse and encounters deep snow, there is a possibility that the snow could push the lower end of the snow flap 106 against the endless drive track 104. As a result, the turning endless drive track 104 pulls the snow flap 106 down, thereby pulling the rear end of the tunnel 100 down and preventing further movement of the snowmobile in reverse.

There is therefore a desire for a snowmobile that redirects snow projected by the endless drive track onto a heat exchanger assembly provided in the tunnel that addresses the drawbacks associated with snow flaps that have been identified above.

SUMMARY

It is an object of the present technology to ameliorate at least some of the inconveniences present in the prior art.

According to one aspect of the present technology, there is provided a snowmobile having a frame having a tunnel; at least one ski operatively connected to the frame; a motor supported by the frame; an endless drive track disposed at least in part below the tunnel and operatively connected to the motor for propulsion of the snowmobile; a suspension assembly operatively connected to the frame, the suspension assembly supporting and tensioning the endless drive track, the suspension assembly having a least one rear idler wheel, the at least one idler wheel defining an idler wheel rotation axis; and a snow guard connected to the suspension assembly. The snow guard has a deflector. The deflector has a leading edge and a trailing edge. The leading edge is rearward and upward of the idler wheel rotation axis. The trailing edge is rearward and upward of the idler wheel rotation axis.

In some embodiments of the present technology, the leading edge is upward and forward of the trailing edge.

In some embodiments of the present technology, an angle between the leading edge and the trailing edge about the idler wheel rotation axis is less than 90 degrees.

In some embodiments of the present technology, the angle is less than 45 degrees.

In some embodiments of the present technology, the deflector has an inner arcuate surface and an outer surface. The inner arcuate surface faces the endless drive track. The idler wheel rotation axis extends through a center of curvature of the inner arcuate surface.

In some embodiments of the present technology, the endless drive track has a plurality of external lugs having a lug height. The deflector has an inner arcuate surface and an outer surface. The inner arcuate surface faces the endless drive track. A distance between the at least one rear idler wheel and the inner arcuate surface is greater than the lug height.

In some embodiments of the present technology, a gap is defined between the inner arcuate surface and an end of an external lug of the plurality of external lugs that is disposed between the inner arcuate surface and the at least one idler wheel. The gap is smaller than the lug height.

In some embodiments of the present technology, the deflector has a width that is greater than a width of the endless drive track.

In some embodiments of the present technology, the width of the deflector is greater than a width of a rear end of the tunnel.

In some embodiments of the present technology, the deflector has an inner arcuate surface and an outer surface. The inner arcuate surface faces the endless drive track. A line tangent to the inner arcuate surface at the leading edge of the deflector does not intersect the endless drive track.

In some embodiments of the present technology, the line intersects the tunnel forward of a rear end of the tunnel.

In some embodiments of the present technology, the tunnel has a heat exchanger assembly. The line intersects the heat exchanger assembly.

In some embodiments of the present technology, the at least one rear idler wheel is a rear left idler wheel and a rear right idler wheel. The suspension assembly has a left slide rail and a right slide rail. The rear left idler wheel is rotationally connected to the left slide rail. The rear right idler wheel is rotationally connected to the right slide rail.

The snow guard has a left arm connecting the deflector to the left slide rail and a right arm connecting the deflector to the right slide rail.

In some embodiments of the present technology, the left slide rail is laterally between the left arm and the rear left idler wheel, and the right slide rail is laterally between the right arm and the rear right idler wheel.

In some embodiments of the present technology, the suspension assembly has an axle connected between the left slide rail and the right slide rail. The rear left idler wheel is rotationally connected to the axle. The rear right idler wheel is rotationally connected to the axle. The left arm is connected to the axle. The right arm is connected to the axle.

In some embodiments of the present technology, the suspension assembly has a left track tensioner connected between the axle and the left slide rail and a right track tensioner connected between the axle and the right slide rail. The left and right track tensioners adjust a longitudinal position of the left and right rear idler wheels and of the snow guard, the snow guard moving longitudinally with the left and right idler wheels.

In some embodiments of the present technology, each of the left and right arms defines a slot. A left pin is connected to the left slide rail and is received in the slot of the left arm. A right pin is connected to the right slide rail and is received in the slot of the right arm.

In some embodiments of the present technology, the snow guard has a left arm and a right arm connecting the deflector to the rear suspension assembly.

In some embodiments of the present technology, front portions of the left and right arms are disposed laterally inward of lateral edges of the endless drive track.

In some embodiments of the present technology, the snow guard has: a left snow scraper extending from the left arm toward an inner surface of the endless driver track; and a right snow scraper extending from the right arm toward the inner surface of the endless driver track.

In some embodiments of the present technology, the deflector is disposed rearward of a rear end of the tunnel.

In some embodiments of the present technology, a bumper is connected to a rear portion of the tunnel. The deflector is disposed rearward of a rear end of the bumper.

In some embodiments of the present technology, the tunnel has a heat exchanger assembly. The deflector has a width that is greater than a width of a rear portion of the heat exchanger assembly.

In some embodiments of the present technology, the at least one idler wheel and the snow guard move together relative to the tunnel as the rear suspension assembly extends and compresses.

For purposes of the present application, terms related to spatial orientation when referring to a snowmobile and components in relation to the snowmobile, such as "forwardly", "rearward", "left", "right", "above" and "below", are as they would be understood by a driver of the snowmobile, with the snowmobile in a straight ahead orientation (i.e. not steered left or right), and in an upright position (i.e. not tilted).

Embodiments of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

In case of discrepancies between definitions of terms provided in the present application and definitions of these terms provided in documents incorporated herein by reference, the definitions provided in the present application take precedence.

Additional and/or alternative features, aspects and advantages of embodiments of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 2:
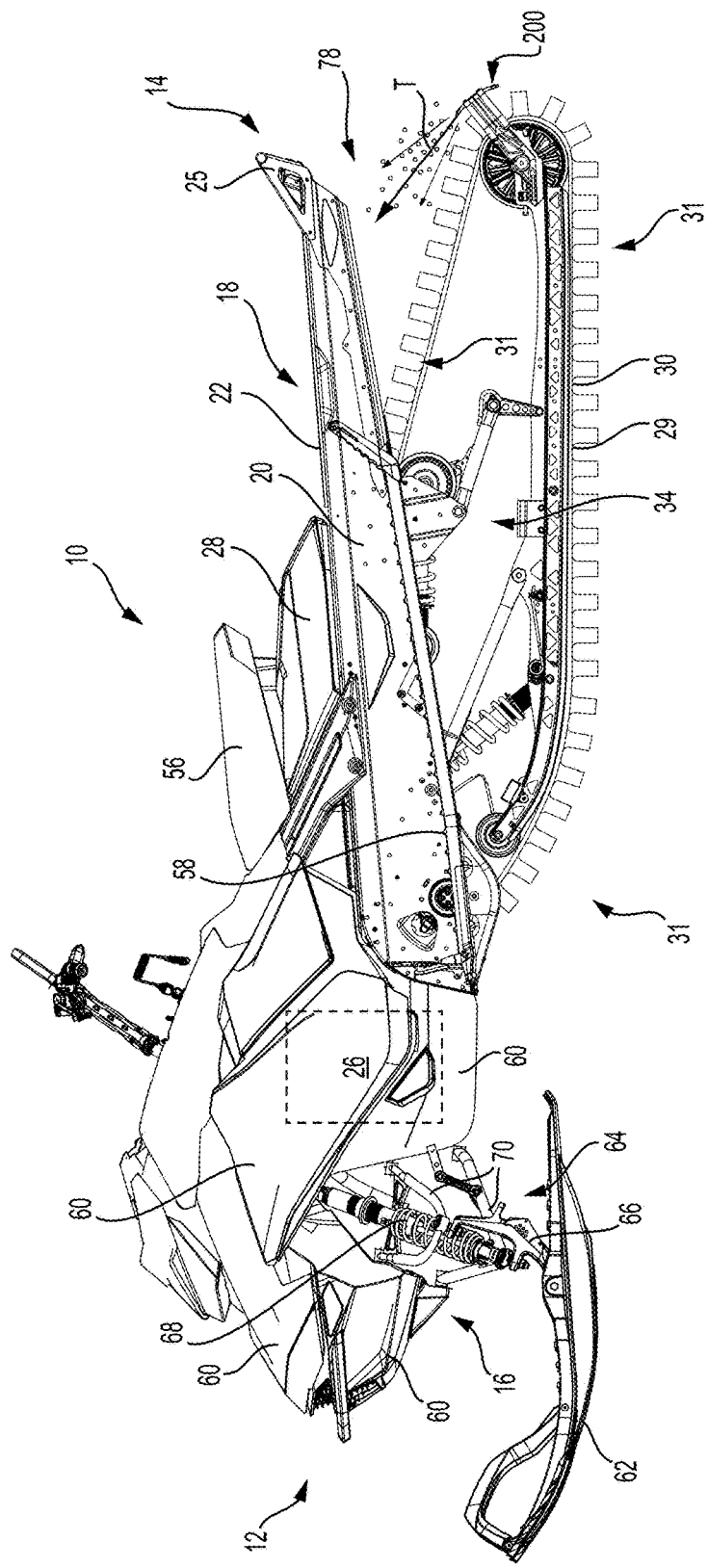
FIG. 2 is a left side elevation view of a snowmobile having a snow guard.
Figure 3:
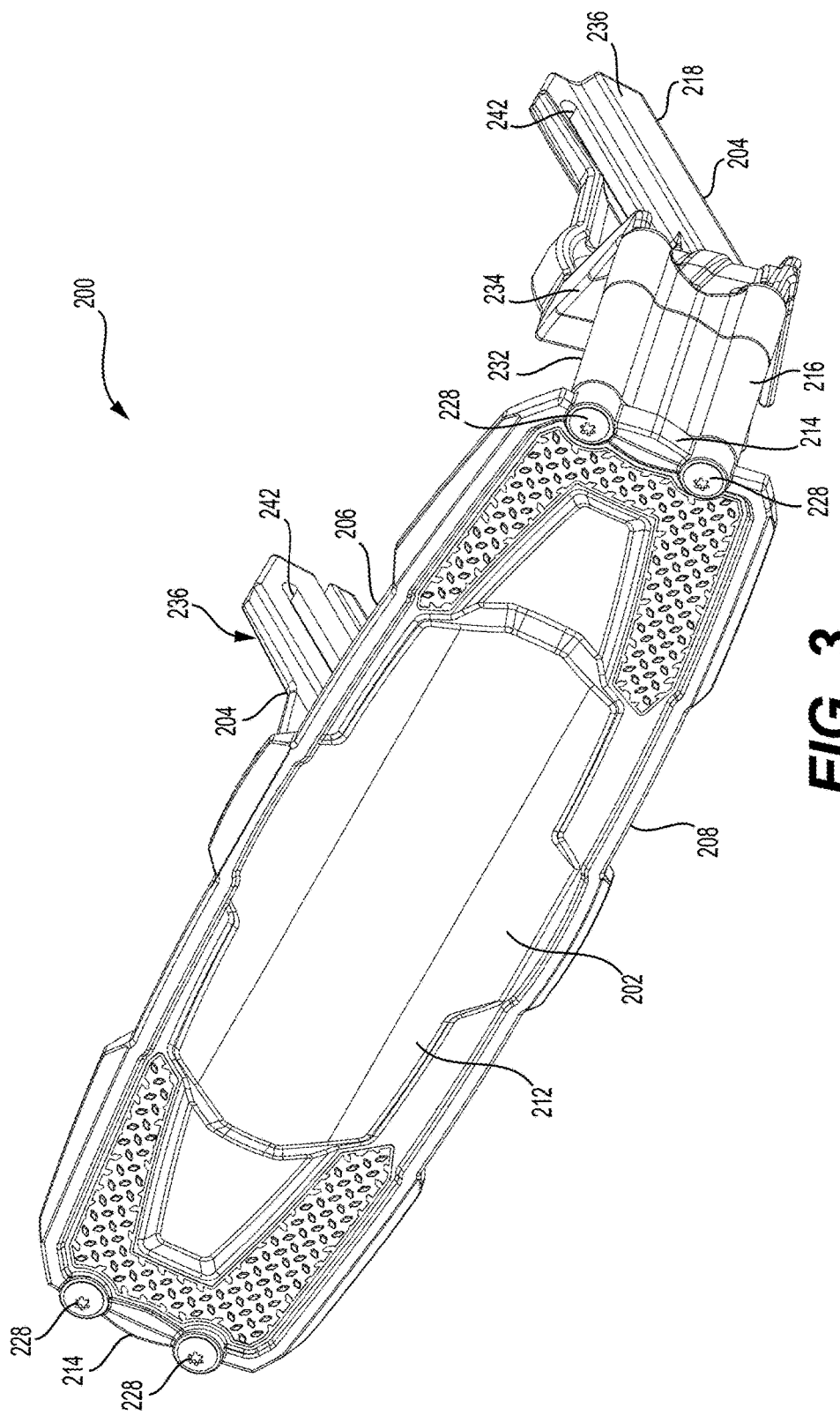
FIG. 3 is a rear, right side perspective view of the snow guard of the snowmobile of FIG. 2.

With reference to FIG. 2, a snowmobile 10 includes a front end 12 and a rear end 14 which are defined consistently with a travel direction of the snowmobile 10. The snowmobile 10 has a frame 16. The frame 16 includes a tunnel 18. The tunnel 18 is formed from sheet metal parts assembled to form an inverted U-shape when viewed from the front or rear end 12, 14. The inverted U-shaped tunnel 18 has left and right side portions 20 and a central portion 22 extending between the side portions. The central portion 22 has a heat exchanger assembly 24 (FIG. 9) as will be described in more detail below. A bumper 25 is connected to a rear portion of the tunnel 18.

A motor 26, schematically illustrated in dotted lines in FIG. 2, is supported by the frame 16 forward of the tunnel 18. In the illustrated embodiment, the motor 26 is an internal combustion engine 26, but it is contemplated that it could be, for example, an electric motor or another type of motor. A fuel tank 28, supported on the tunnel 18, stores fuel to be supplied to the engine 26.

Figure 10:
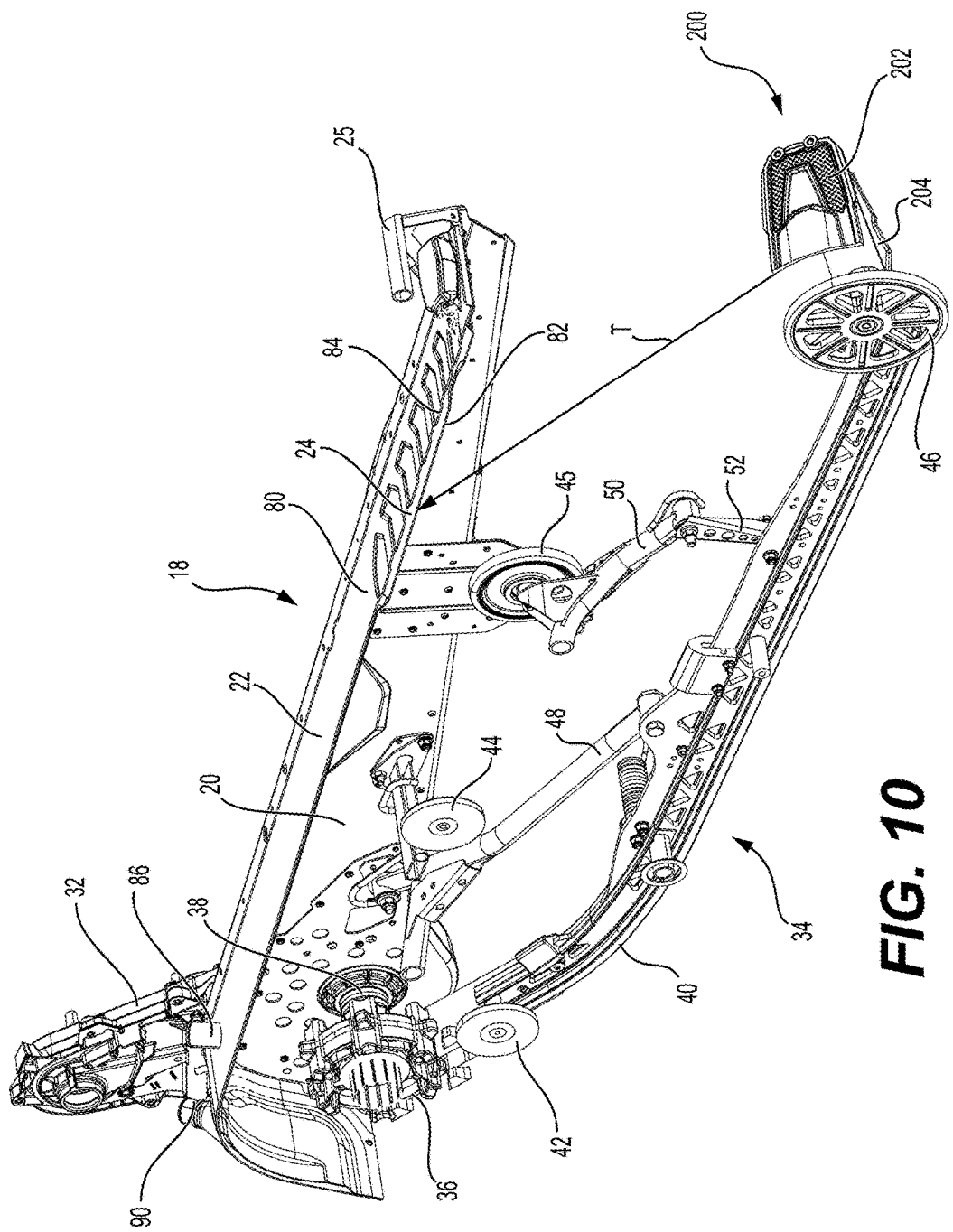
FIG. 10 is a rear, left side cross-sectional view of the tunnel, suspension assembly and snow guard of the snowmobile of FIG. 2.

An endless drive track 30 is disposed below the tunnel 18, and is operatively connected to the engine 26 via a drivetrain including a continuously variable transmission (CVT) (not shown) and a chain and sprocket assembly (not shown). The chain and sprocket assembly is housed inside a chain case 32 (FIG. 10). Other types of drivetrains are contemplated. The endless drive track 30 is driven by the engine 26 to run about a rear suspension assembly 34 connected to the tunnel 18 for propulsion of the snowmobile 10. The suspension assembly 34 supports and tensions the endless drive track 30. The endless drive track 30 has an endless belt 29 and plurality of external lugs 31 extending from an outer surface thereof.

Figure 1:
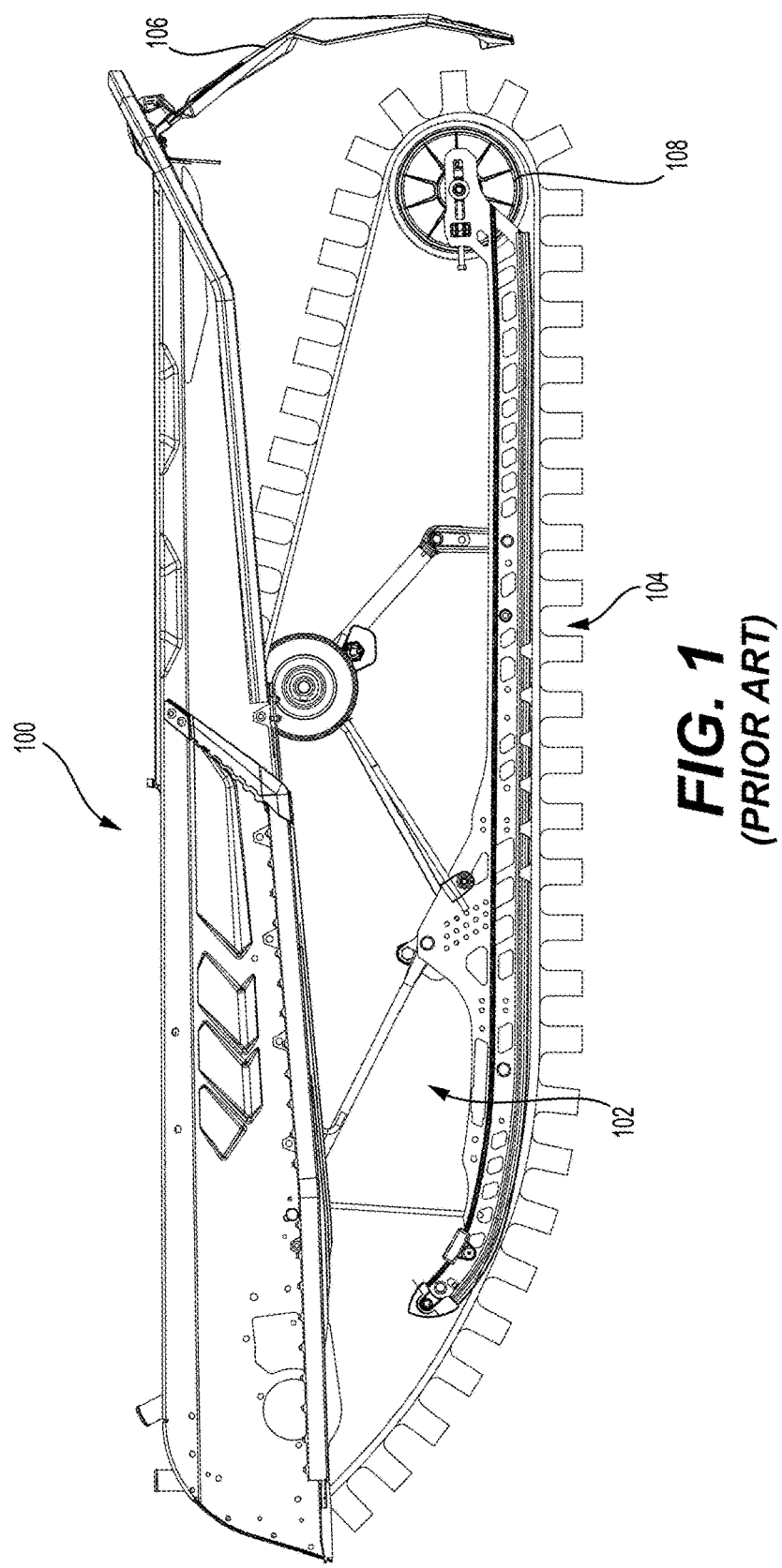
FIG. 1 is a left side elevation view of a prior art tunnel, suspension assembly, endless drive track and snow flap.
Figure 8:
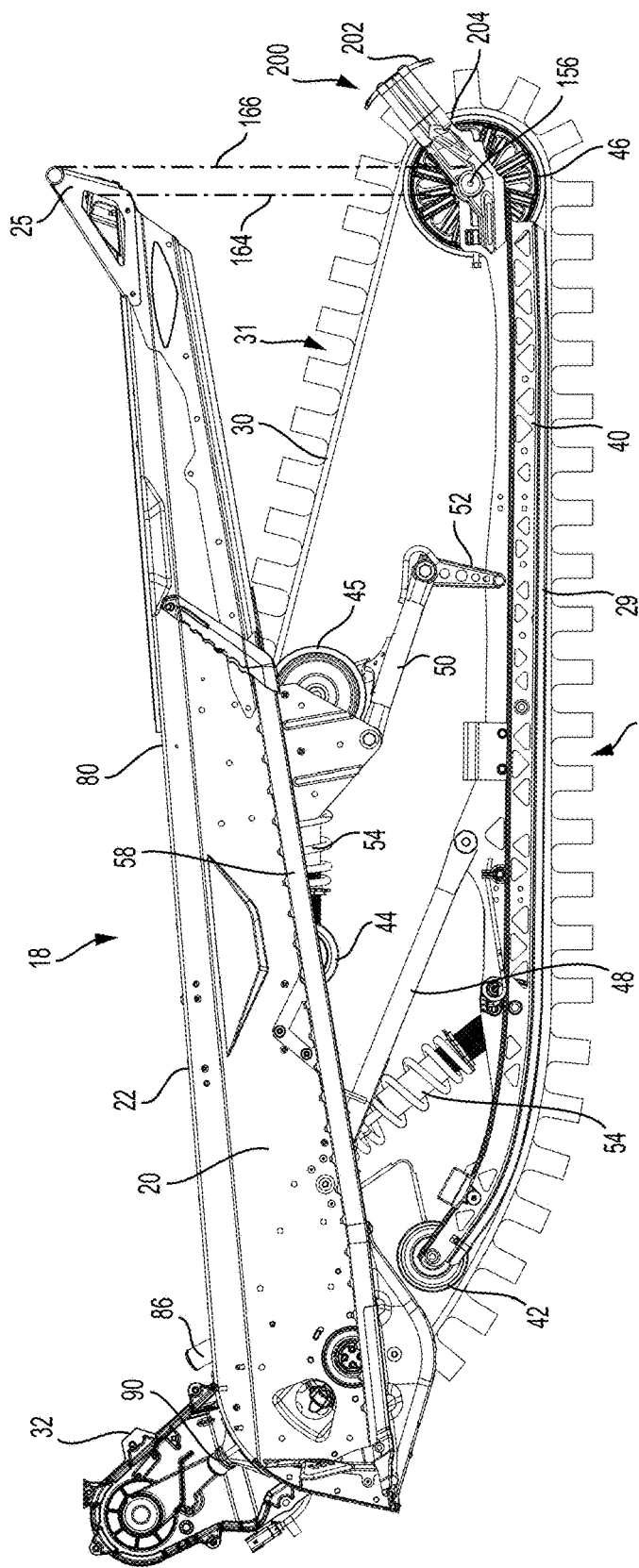
FIG. 8 is a left side elevation view of the tunnel, suspension assembly, endless drive track and snow guard of the snowmobile of FIG. 2.

With reference to FIGS. 8 and 10, the rear suspension assembly 34 includes a pair of drive sprockets 36 (one of which is shown in FIG. 10) mounted on a drive axle 38, a pair of slide rails 40 in sliding contact with the endless drive track 30, two front idler wheels 42, four lower intermediate idler wheels (not shown), two front upper intermediate idler wheels 44, two rear upper intermediate wheels 45, and two rear idler wheels 46. The front left and right idler wheels 42 are rotationally connected to the front of the left and right slide rails 40 respectively. The rear left and right idler wheels 46 are rotationally connected to the rear of the left and right slide rails 40 respectively, as will be described in more detail below. The two lower left intermediate idler wheels and the two lower right intermediate idler wheels are rotationally connected to the left and right slide rails 40 respectively at positions longitudinally intermediate the front and rear idler wheels 42, 46. The two upper left intermediate idler wheels 44, 45 and the two upper right intermediate idler wheels 44, 45 are rotationally connected to the left and right side portions 20 of the tunnel 18 respectively at positions longitudinally intermediate the front and rear idler wheels 42, 46. The rear suspension assembly 34 also includes a front suspension arm 48, a rear suspension arm 50 and rocker arms 52 connecting the slide rails 40 to the tunnel 18. The rear suspension assembly 34 also includes two shock absorber and coil spring assemblies 54. The rear suspension assembly 34 has other features and components which will not be described herein. It is contemplated that the snowmobile 10 could be provided with a different embodiment of a rear suspension assembly 34 than the one described above. For example, the rear suspension assembly 34 could be replaced by the rear suspension assembly 102 illustrated in FIG. 1. Other types of rear suspension assemblies are also contemplated.

Returning to FIG. 2, a straddle seat 56 is positioned atop the fuel tank 28. The seat 56 is adapted to accommodate a driver of the snowmobile 10. It is contemplated that the seat 56 could also be configured to accommodate one or more passengers. It is also contemplated that the snowmobile 10 could include an additional one or more seats for passengers. A footrest 58 is positioned on each side of the snowmobile 10 below the seat 56 to accommodate the driver's feet. Each of the left and right footrests 58 extends generally laterally outwardly from the corresponding left and right side portion 20 of the tunnel 18. In the illustrated embodiment, the footrests 58 are fastened to their respective side portion 20. It is however contemplated that the footrest 58 could be formed integrally with the side portions 20 of the tunnel 18.

At the front end 12 of the snowmobile 10, fairings 60 enclose the engine 26, part of the drive train and other components of the snowmobile 10 such as the air intake system (not shown).

Two skis 62 are positioned at the front end 12 of the snowmobile 10. Each ski 62 is attached to the frame 16 through a corresponding front suspension assembly 64. Each front suspension assembly 64 includes a ski leg 66, a shock absorber assembly 68, two A-arms 70 and ball joints (not labeled). Other types of front suspension assemblies are contemplated.

A steering assembly 72, including a steering column 74 and a handlebar 76, is provided forward of the seat 56. The steering column 74 is rotationally connected to the frame 16. The handlebar 76 is connected to the upper end of the steering column 74. The handlebar 76 is used to rotate the steering column 74, and thereby the skis 72, in order to steer the snowmobile 10.

At the rear of the snowmobile 10, a snow guard 200 is connected to the rear suspension assembly 34. The snow guard 200 deflects snow and ice 78 projected by the drive track 30 toward the tunnel 18 when the snowmobile 10 is being driven as illustrated in FIG. 2. The snow guard 200 and its connection to the rear suspension assembly 34 will be described in more detail below.

The snowmobile 10 includes other components such as a display cluster, an exhaust system, an air intake system, and the like. As it is believed that these components would be readily recognized by one of ordinary skill in the art, further explanation and description of these components will not be provided herein.

Figure 9:
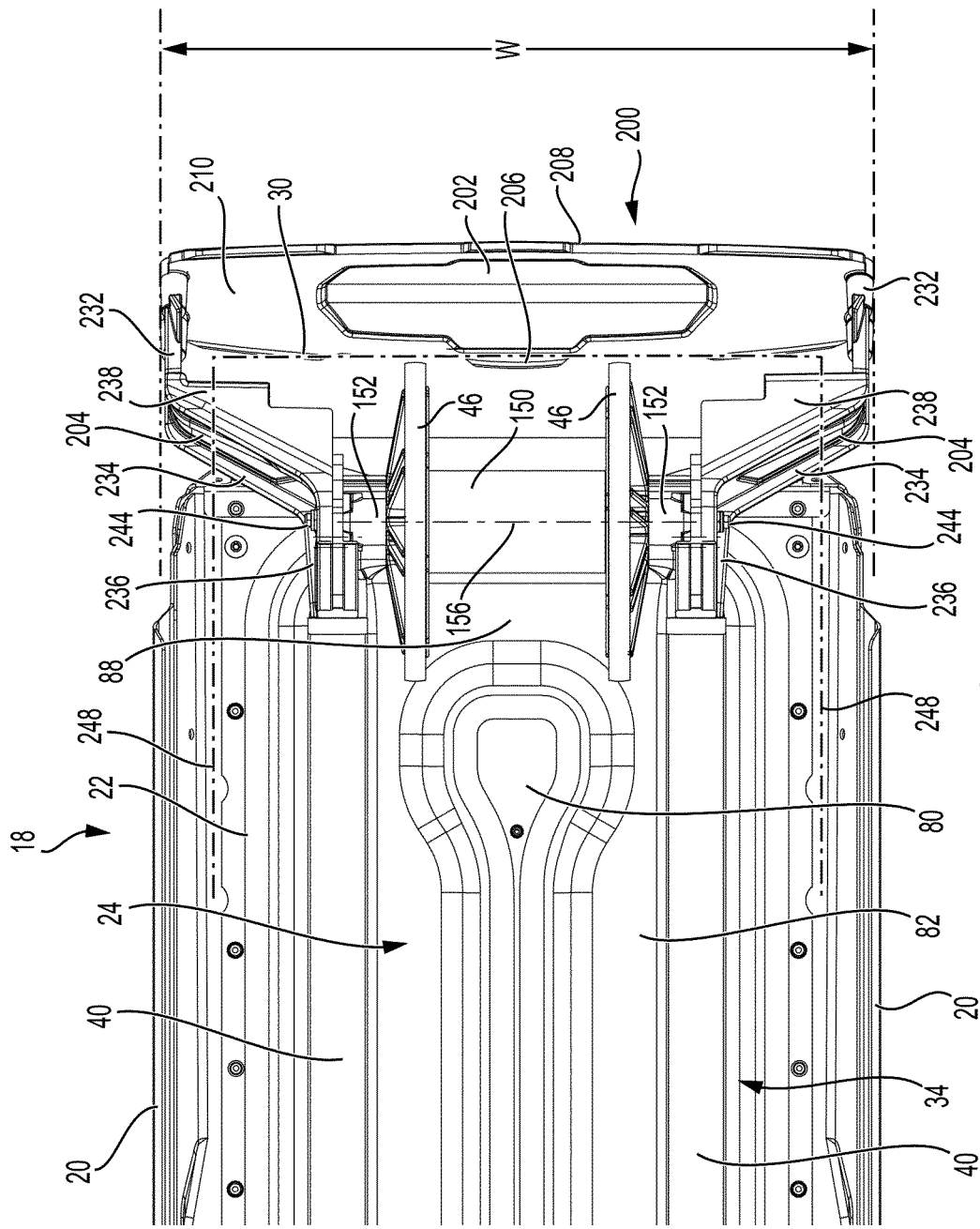
FIG. 9 is a bottom plan view of the snow guard and rear portions of the tunnel and suspension assembly of the snowmobile of FIG. 2.

With reference to FIGS. 8 to 10, the heat exchanger assembly 24 will now be described in more detail. The heat exchanger assembly 24 has a top part 80 and a bottom part 82 connected to the top part 80. The bottom part 82 defines a recess such that a passage 84 is defined between the top and bottom parts 80, 82. The passage 84 is fluidly connected to an inlet pipe 86, extends rearward from the inlet pipe 86 along a right side of the central portion 22 of the tunnel 18 to a wide portion 88 of the passage 84 near a rear of the tunnel 18, and then extends forward from the wide portion 88 along a left side of the central portion 22 to fluidly connect to an outlet pipe 90. The inlet pipe 86 receives hot coolant from the engine 26. From the inlet pipe 86, the coolant flows through the passage 84 to the outlet pipe 90 and is cooled in the process. From the outlet pipe 90, the cooled coolant is returned to the engine 26. Additional details regarding heat exchangers assemblies of the type of the heat exchanger assembly 24, and alternative implementations thereof, can be found in United States Patent Publication No. US 2017/0158046 A1, published Jun. 8, 2017, the entirety of which is incorporated herein by reference.

Figure 11:
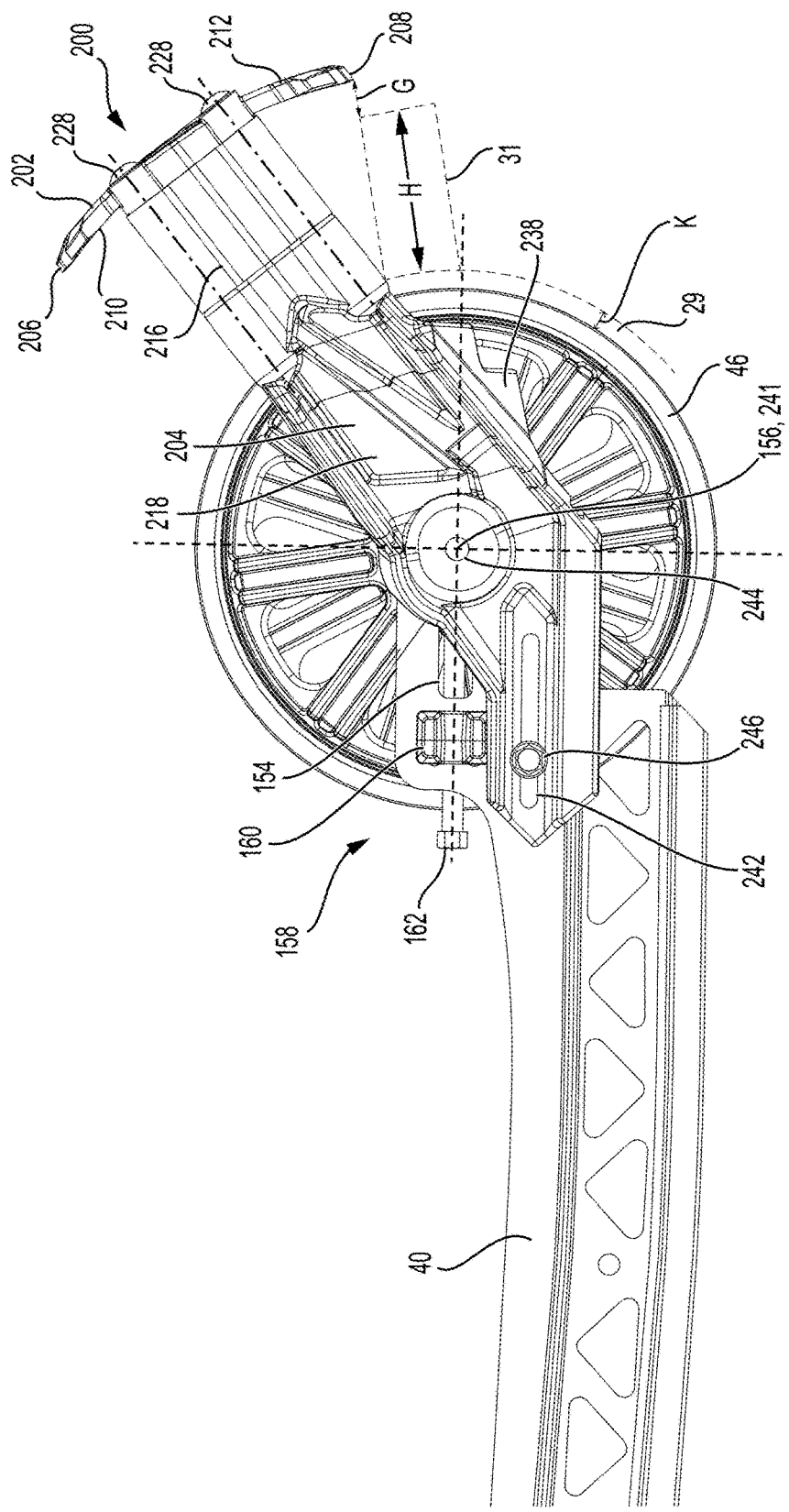
FIG. 11 is a left side elevation view of a rear portion of a slide rail, rear idler wheel, track tensioner and snow guard of the snowmobile of FIG. 2.

Turning now to FIGS. 8 to 11, the manner in which the rear idler wheels 46 are connected to the slide rails 40 will be described in more detail. As best seen in FIG. 9, a hollow shaft 150 extends between and connects the two rear idler wheels 46. An axle 152 rotationally extends between and connects to the left and right slide rails 40 via slots 154 defined in the slide rails 40. The axle 152 extends through the rear left and right idler wheels 46 and the shaft 150. The rear left and right idler wheels 46 are rotationally connected to the axle 152 by bearings (not shown) such that the rear idler wheels 46 can rotate about the axle 152. The rear left and right idler wheels 46 define an idler wheel rotation axis 156 about which they rotate. As can be seen in FIG. 11, a left track tensioner 158 is connected between the left end of the axle 152 and the left slide rail 40. A corresponding right track tensioner 158 (not shown) is connected between the right end of the axle 152 and the right slide rail 40. Each track tensioner 158 consists of a nut 160 and a screw 162. Turning the nuts 160 causes the screws 162 to move longitudinally forward or rearward, depending on the direction of rotation of the nuts 160. As a result, the axle 152 moves inside the slots 154 and the rear idler wheels 46 and the idler wheel rotation axis 156 move longitudinally. By moving the rear idler wheels 156 using the track tensioners 158, the tension in the endless drive track 30 can be adjusted.

As can be seen in FIG. 8, in the illustrated position (i.e. when the snowmobile 10 is on flat level ground), the rearmost points of the rear idler wheels 46 are rearward of the rear end of the tunnel 18, the location of which is identified by vertical line 164, and rearward of the rear end of the bumper 25, the location of which is identified by vertical line 166. The rearmost points of the rear idler wheels 46 are rearward of the vertical line 164 for all longitudinal positions of the rear idler wheels 46. The rearmost points of the rear idler wheels 46 are rearward of the vertical line 166 for a portion of the longitudinal positions of the rear idler wheels 46. In other embodiments, the relationships between the rearmost points of the rear idler wheels 46 and the lines 164 and 166 depend on the length of the endless drive track 30, the configuration of the rear suspension assembly 34, the length of the tunnel 18, the length of the bumper 25, and the degree of adjustment of the rear idler wheels 46 by the track tensioners 158. It is contemplated that the track tensioners 158 could be replaced by a different type of track tensioners. It is also contemplated that the track tensioners 158 could be omitted and that the rear idler wheels 46 could have a fixed connection relative to the slide rails 40. In such an embodiment, one or more track tensioners could be provided elsewhere to adjust the tension in the endless drive track 30. It is contemplated that the rear idler wheels 46 could be rotationally connected to the slide rails 40 differently than described above. It is also contemplated that the rear suspension assembly 34 could have only one or more than two rear idler wheels 46.

With reference to FIGS. 3 to 7, the snow guard 200 will be described in more detail. The snow guard 200 has a deflector 202 and a pair of arms 204. The arms 204 connect the deflector 202 to the rear suspension assembly 34 as will be described in more detail below. As the snow guard is connected to the rear suspension assembly 34, the rear suspension assembly 34 and the snow guard 200 move together relative to the tunnel 18 as the rear suspension assembly 34 extends and compresses during operation of the snowmobile 10.

The deflector 202 has a leading edge 206, a trailing edge 208, an inner arcuate surface 210, an outer surface 212, and left and right lateral edges 214. When the snow guard 200 is connected to the rear suspension assembly 34 as shown in FIG. 11, the leading edge 206 is upward and forward of the trailing edge 208, the inner arcuate surface 210 faces forward and downward so as to face the endless drive track 30, and the outer surface 212 faces upward and rearward. As best seen in FIG. 9, a width W of the deflector 202 is greater than a width of the endless drive track 30 and greater than a width of the rear end of the tunnel 18. It is contemplated that the deflector 202 could be wider than the endless drive track 30 but narrower than the rear end of the tunnel 18. As can also be seen in FIG. 9, the width W is also greater than the width of the central portion 22 of the tunnel 18 and the width of the rear portion of heat exchanger assembly 24. With reference to FIGS. 9 and 10, it can be seen that each the side portions 20 of the tunnel 18 has an outward bend near a lower edge thereof. As can be seen in FIG. 9, the width W is greater than the lateral distance between the upper edges of the side portions 20 and the lateral distance between the lower edges of the side portions 20, but the width W is less than the lateral distance between the laterally outward-most points of the bends in the side portions 20. As the left and right footrests 58 extend generally laterally outwardly from their corresponding left and right side portions 20 of the tunnel 18, the width W is also less than the lateral distance between the left and right footrests 58. It is also contemplated that the inner surface 210 of the deflector 202 could have a shape other than arcuate. For example, it is contemplated that the inner surface 210 could be flat. In the present embodiment, the deflector 202 is made of plastic, but other materials, such as metal for example, are contemplated.

In the present embodiment, the left and right arms 204 are mirror images of each other. As such only the left arm 204 will be described herein in detail. Features of the right arm 204 have been labeled with the same reference numerals in the figures as their corresponding features of the left arm 204. It is contemplated that the left and right arms 204 could not be mirror images of each other.

Figure 7:
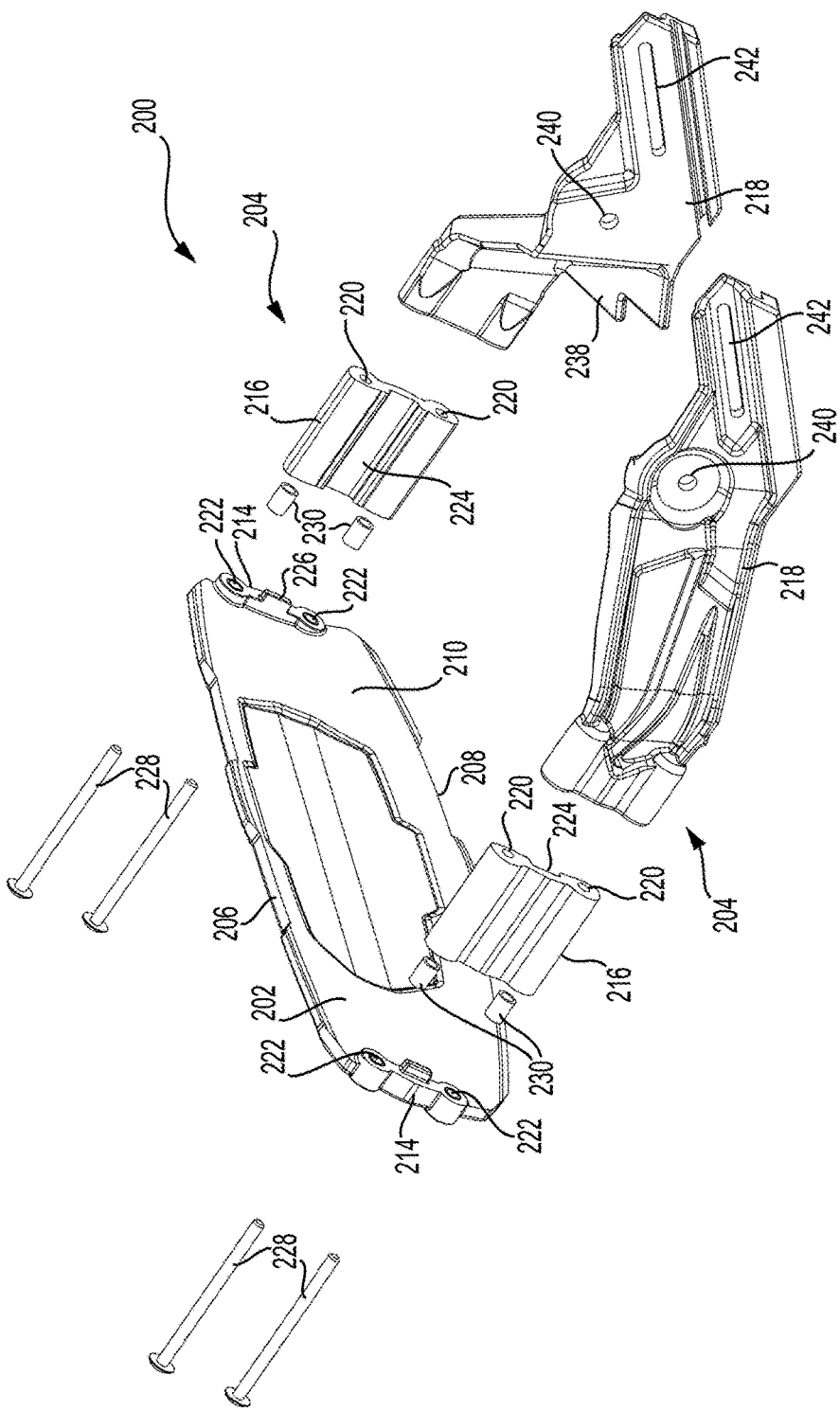
FIG. 7 is a front, right side exploded view of the snow guard of FIG. 3.

As best seen in FIG. 7, the left arm 204 is made of two parts 216, 218. The part 216 is disposed between the part 218 and the deflector 202. The part 216 defines two corresponding apertures 220 that extend therethrough. The deflector 202 defines two corresponding apertures 222 therethrough. The part 218 also defines two corresponding apertures (not shown) that extend partway through it. The apertures in the part 218 are threaded. It is contemplated that the apertures 220 could also be completely or partially threaded. The part 216 defines a recess 224 on a laterally inner side thereof. The recess 224 cooperates with a tab 226 extending from the inner arcuate surface 210 to help align the apertures 220, 222 with each other during assembly. Two screws 228 are inserted through the aperture 222 in the deflector 202, the apertures 220 in the part 216 of the arm 204 and the apertures in the part 218 in order to fasten the three together. In order to reinforce the region of the apertures 222 in the deflector 202, bushings 230 are inserted in the aperture 222 prior to inserting the screws 228 in the apertures 222. In the present embodiment, the parts 216 are made of metal, but other materials, such as plastic, are contemplated. It is also contemplated that left arm 204 could be made of more than two parts. It is also contemplated that the parts 216, 218 and the deflector 202 could be connected to each other by means other than the screws 228. It is also contemplated that the deflector 202 and the left and right arms 204 could be integrally formed as a single part.

Figure 13:
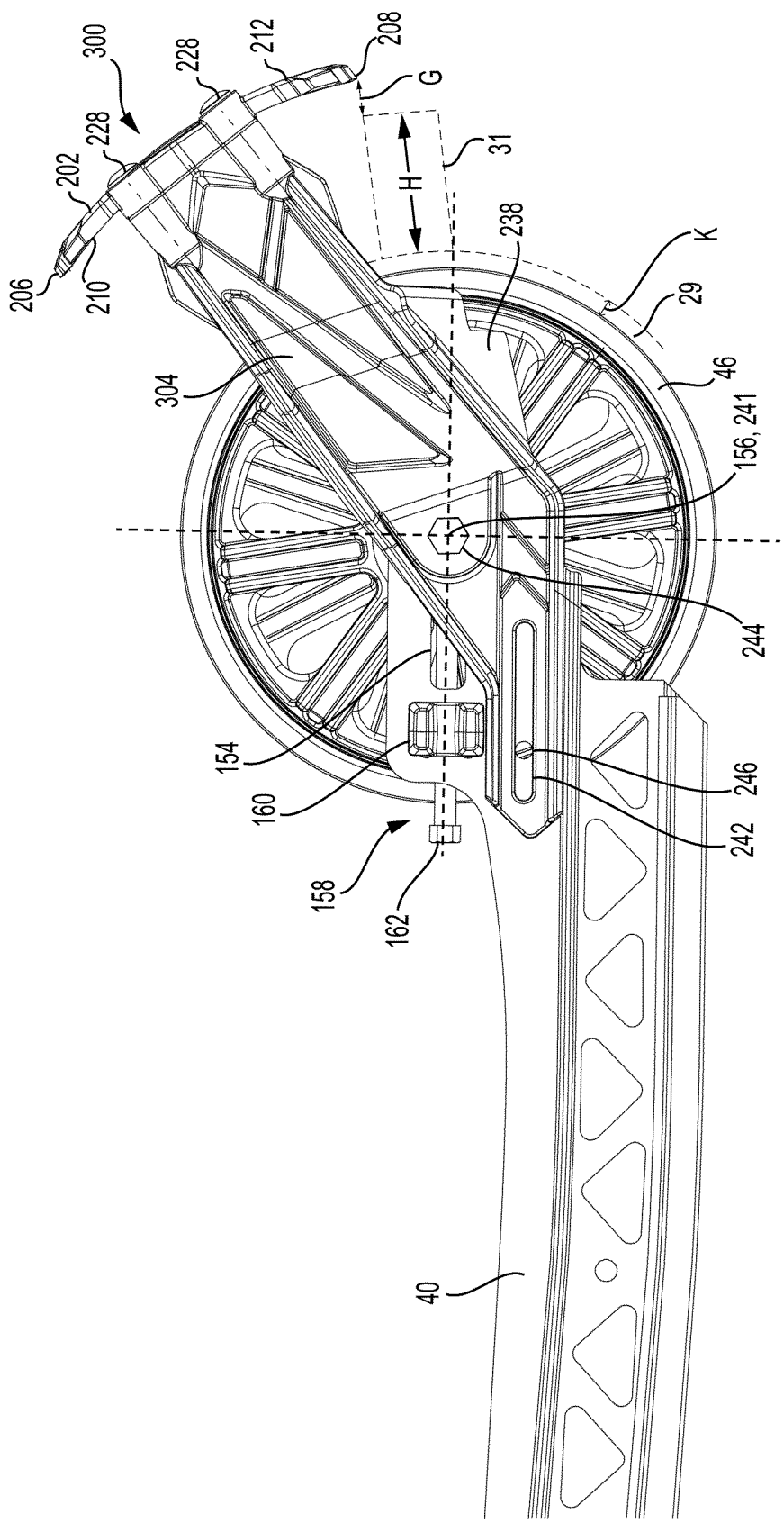
FIG. 13 is a left side elevation view of a rear portion of a slide rail, rear idler wheel, track tensioner and an alternative embodiment of a snow guard of the snowmobile of FIG. 2.

In an alternative embodiment of the snow guard 200 shown in FIG. 13, a snow guard 300 has left and right arms 304 made of a single part that are fastened by two screws 328 each to the deflector 202. The other features of the snow guard 300 are similar to those of the snow guard 200 described herein, have been labeled with the same reference numerals in FIG. 13, and will not be described herein in more detail.

Figure 4:
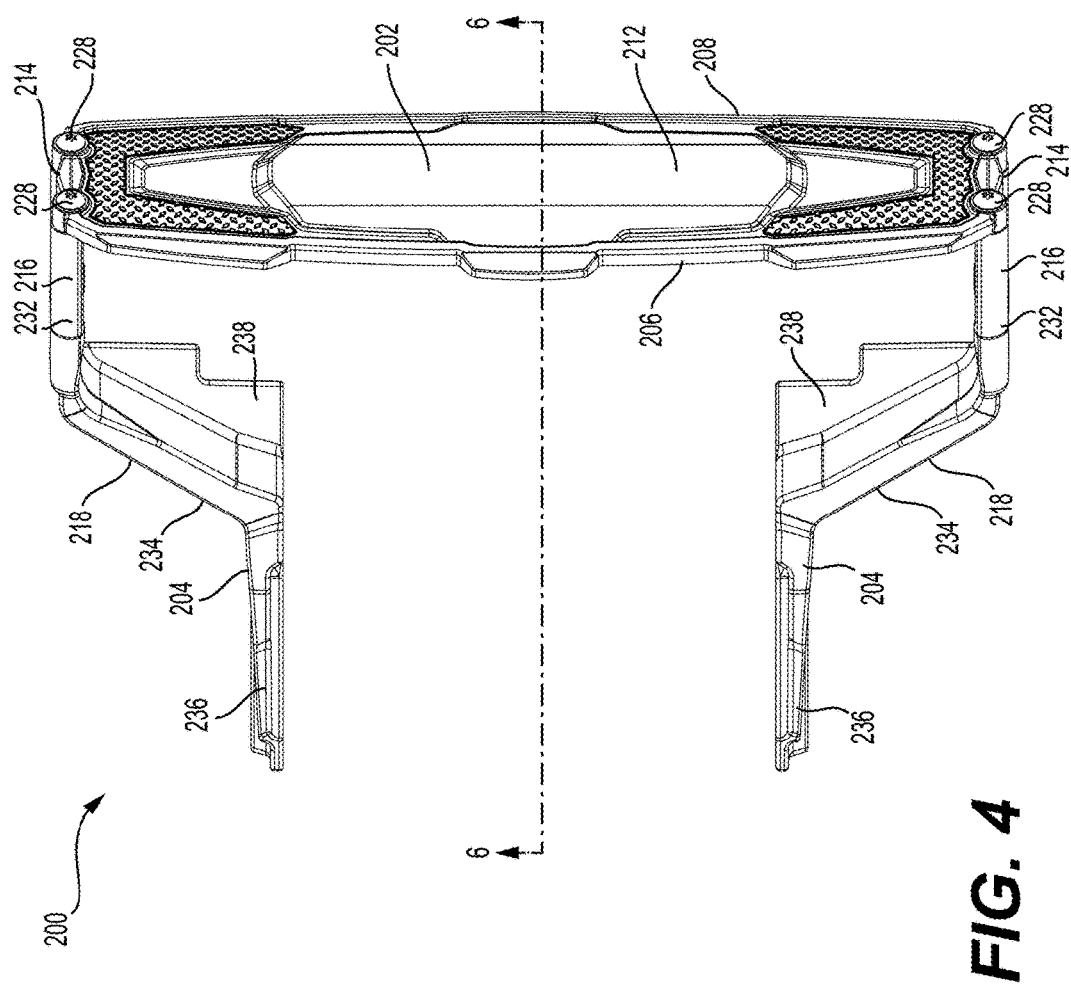
FIG. 4 is a top plan view of the snow guard of FIG. 3.
Figure 5:
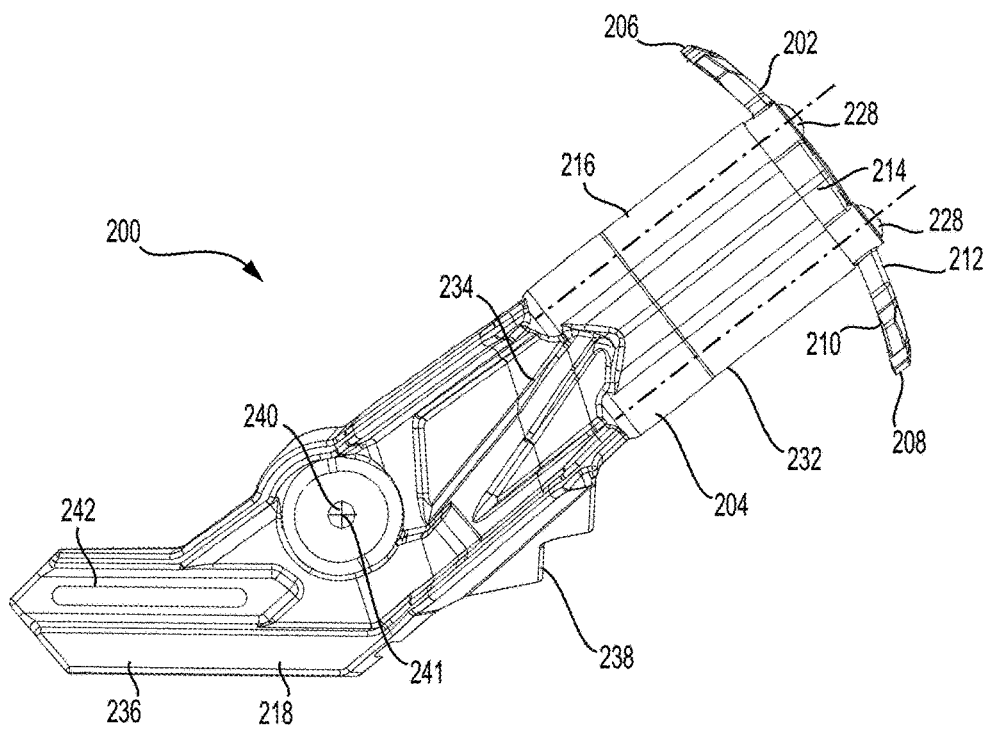
FIG. 5 is a left side elevation view of the snow guard of FIG. 3.
Figure 6:
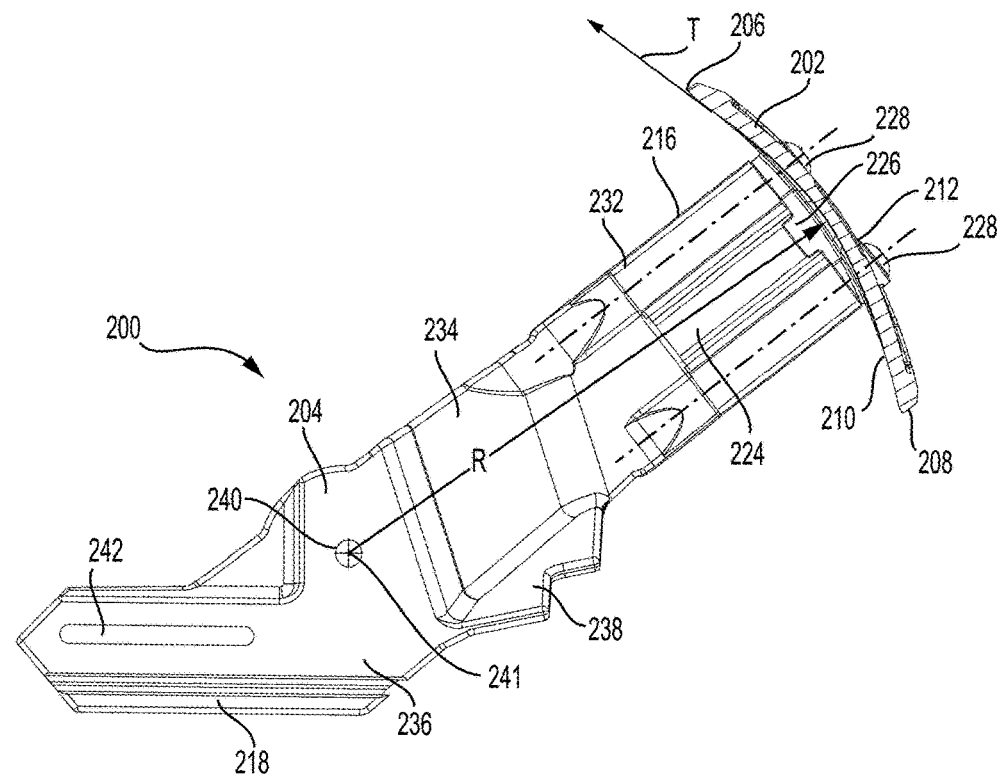
FIG. 6 is a cross-sectional view of the snow guard of FIG. 3 taken through line 6-6 of FIG. 4.

Returning to the snow guard 200, when viewed from above as seen in FIG. 4, once assembled, the left arm 204 has a rear longitudinally extending portion 232, a central diagonally extending portion 234 and a front longitudinally extending portion 236. As can be seen, the front portion 236 is disposed laterally inward of the rear portion 232. When viewed from a left side thereof as seen in FIG. 5, the left arm 204 extends diagonally forward and downward from the deflector 202 to a part of the front portion 236 that extends horizontally. The rear portion 232 includes the part 216 and a rear portion of the part 218. The central and front portions 234, 236 include the rest of the part 218.

A left snow scraper 238 extends rearward from a lower edge of the central portion 234 of the left arm 204. The left snow scraper 238 scrapes snow from the inner surface of the endless drive track 30 during operation of the snowmobile 10 as will be described in greater detail below. It is contemplate that the snow scraper 238 could be omitted.

The portion 236 defines an aperture 240 and a slot 242 used to fasten the left arm 204, and therefore the deflector 202, to the rear suspension assembly 34. In the present embodiment, a center of curvature 241 of the inner arcuate surface 210 of the deflector 202 corresponds to the center of the aperture 240. The slot 242 is at least as long as the slot 154 in the slide rail 40.

The manner in which the left arm 204 connects the deflector 202 to the rear suspension assembly 34 will now be described in more detail with reference to FIGS. 9 and 11. The manner in which the right arm 204 connects the deflector 202 to the rear suspension assembly 34 is the same with respect to the corresponding components of the rear suspension assembly 34 on a right side thereof. As such, the connection of the right arm 204 to the rear suspension assembly 34 will not be described in detail herein.

To connect the left arm 204 to the rear suspension assembly 34, the left arm 204 is disposed on the left side of the left slide rail 40 such that the left slide rail 40 is laterally between the left arm 204 and the rear left idler wheel 46. The aperture 240 is then aligned with a corresponding aperture (not shown) in the left end of the axle 152. A bolt 244 is inserted through the aperture 240 into the axle 152 to fasten the left arm 204 to the axle 152, and thereby to the left slide rail 40. A pin is inserted through the slot 242 and is connected to the left slide rail 40. In the present embodiment, the pin is the shank of a bolt 246. The bolt 246 is inserted through the slot 242 and fastens the front portion 236 of the left arm 204 to the left slide rail 40. The bolt 246 helps prevent the left arm 204 from rotating about the bolt 244.

When the track tensioners 158 are used to adjust the longitudinal position of the rear idler wheels 46, the arms 204, through their connections to the shafts 152, move longitudinally with the rear idler wheels 46. Therefore the snow guard 200 is movable longitudinally with the rear idler wheels 46. The slots 242 permit this longitudinal movement without having to disconnect the bolts 246. The bolt 246 only needs to be loosened prior to the adjustment. It is contemplated that the slots 242 and the bolts 246 could be omitted and replaced by other means of helping to prevent the arms 204 from rotating about the bolts 244. It is also contemplated that the slots 242 and the bolts 246 could be omitted and that connections provided by the bolts 244, or other fasteners, could be sufficient to prevent rotation of the arms 204 about the bolts 244. In an alternative embodiment, the arms 204 are connected to the slide rails 40 and are not movable longitudinally. Such an embodiment is contemplated for embodiments of the rear suspension assembly 34 where the rear idler wheels 46 are not movable longitudinally, although embodiments where the rear idler wheels 46 are movable longitudinally are not excluded.

When the snow guard 200 is connected to the rear suspension assembly 34, the front portions 236 are disposed laterally inward of the lateral edges 248 of the endless drive track 30, as can be seen in FIG. 9. As can also be seen in FIG. 9, the left and right snow scrapers 238 extend toward the inner surface of the endless drive track 30 in proximity to this surface. During operation of the snowmobile 10, some of the snow that accumulates on the inner surface of the endless drive track 30 near the lateral edges 248 is scraped off by the snow scrapers 238.

As can be seen in FIG. 8, the deflector 202 is disposed rearward of the rear end of the tunnel 18 (line 164) and rearward of the rear end of the bumper 25 (line 166). In the present embodiment, this is true for all longitudinal positions of the rear idler wheels 46 with which the snow guard 200 moves longitudinally. In other embodiments, the relationships between the deflector 202 and the lines 164 and 166 depend on the length of the endless drive track 30, the configuration of the rear suspension assembly 34, the length of the tunnel 18, the length of the bumper 25, and the degree of adjustment of the rear idler wheels 46 by the track tensioners 158.

As can be seen in FIG. 11, when the snow guard 200 is connected to the rear suspension assembly 34, the bolts 244 and the apertures 240 are coaxial with the idler wheel rotation axis 156. Therefore, the idler wheel rotation axis 156 extends through the center of curvature 241 of the inner arcuate surface 210 of the deflector 202. As a result, the distance between the inner arcuate surface 210 and the outer surface of the rear idler wheels 46 is constant. In alternative embodiments, this distance varies. The arms 204 of the snow guard 200 are sized such that the radius of curvature R (FIG. 6) of the inner arcuate surface 210 of the deflector 202 is large enough to permit the passage of the endless drive track 30 between the deflector 202 and the rear idler wheels 46. In other words, the arms 204 are sized such that the distance between the rear idler wheels and the inner arcuate surface 210 is greater than the combined dimension of the thickness K of the endless belt 29 and the lug height H of the external lugs 31 (FIG. 11). In embodiments where the external lugs 31 have different lug heights, the arms 204 are sized in consideration of the external lugs 31 having the largest lug height H. As can be seen in FIG. 11, as an external lug 31 passes between the deflector 202 and the rear idler wheels 46, there is a gap G defined between the inner arcuate surface 210 and the end of the external lug 31. This gap G should be relatively small in order to have the deflector 202 effectively deflect snow projected by the endless drive track 30 toward the tunnel 18. In some embodiments, the gap G is smaller than the lug height H. In some embodiments, the gap G is smaller than half the lug height H. In some embodiments, the gap G is smaller than a fifth of the lug height H.

Figure 12:
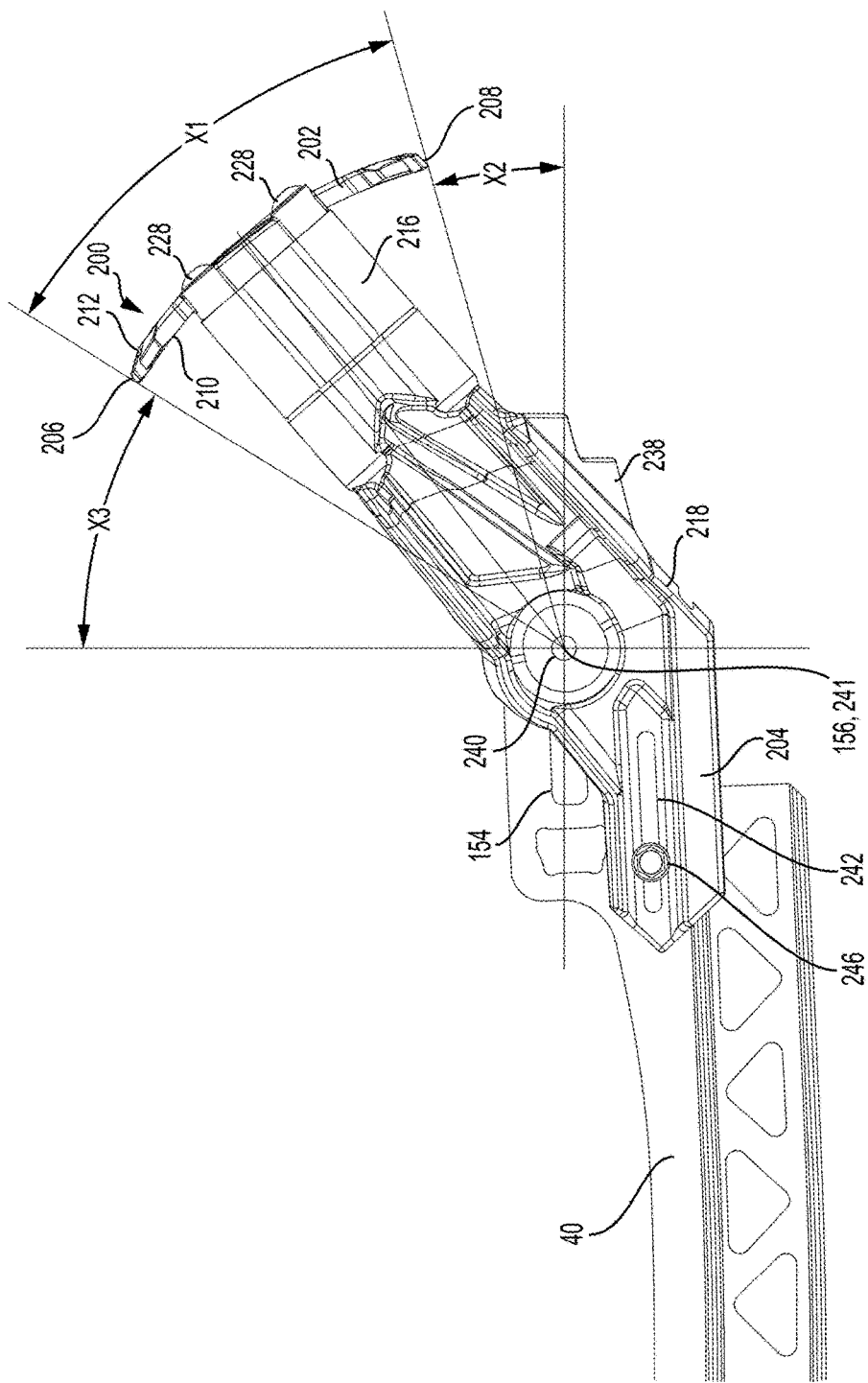
FIG. 12 is a left side elevation view of the rear portion of the slide rail, rear idler wheel and snow guard of FIG. 11.

As can be seen in FIG. 12, when the snow guard 200 is connected to the rear suspension assembly 34, the leading and trailing edges 206, 208 of the deflector 202 are rearward and upward of the idler wheel rotation axis 156. The arc length of inner arcuate surface 210 is selected such that the angle X1 between the leading edge 206 and the trailing edge 208 about the idler wheel rotation axis 156 is less than 90 degrees. In the present embodiment, the angle X1 is less than 45 degrees. The arms 204 are angled so as to position the deflector 202 closer to the horizontal when the snowmobile 10 is on flat level ground. As can be seen in FIG. 12, when the snowmobile 10 is on flat level ground, the angle X2 between the trailing edge 208 and the horizontal about the idler wheel rotation axis 156 is less than the angle X3 between the leading edge 206 and vertical about the idler wheel rotation axis 156. In the present embodiment, the angle X3 is more than twice the angle X2.

The deflector 200 is sized and positioned such that during operation of the snowmobile 10, snow and ice 78 projected from the drive track 30 is deflected toward the tunnel 18 as can be seen in FIG. 2, and more specifically deflected onto the bottom surface of the heat exchanger assembly 84. In the present embodiment, the deflector 202 is positioned such that a line T (FIG. 6) that is tangent to the inner arcuate surface 210 of the deflector 202 at the leading edge 206 does not intersect the endless drive track 30. Otherwise, the endless drive track 30 could interfere with the deflected snow and ice 78 and prevent some of it from reaching the heat exchanger assembly. In the present embodiment, the line T intersects the heat exchanger assembly 84 rearward of the rear upper intermediate idler wheels 45 and forward of a rear end of the heat exchanger assembly 84 as can be seen in FIG. 10. In other embodiments, the line T intersect the tunnel 18 forward of the rear end of the tunnel 18 without necessarily intersecting the heat exchanger assembly 84.

Modifications and improvements to the above-described embodiments of the present technology may become apparent to those skilled in the art. The foregoing description is intended to be exemplary rather than limiting. The scope of the present technology is therefore intended to be limited solely by the scope of the appended claims.

What is claimed is:

1. A snowmobile comprising:
a frame having a tunnel;
at least one ski operatively connected to the frame;
a motor supported by the frame;
an endless drive track disposed at least in part below the tunnel and operatively connected to the motor for propulsion of the snowmobile;
a suspension assembly operatively connected to the frame,
the suspension assembly supporting and tensioning the endless drive track, the suspension assembly having a least one rear idler wheel,
the at least one idler wheel defining an idler wheel rotation axis; and
a snow guard connected to the suspension assembly,
the snow guard having a deflector,
the snow guard having a left arm and a right arm connecting the deflector to the rear suspension assembly,
the deflector having a leading edge and a trailing edge,
the leading edge being rearward and upward of the idler wheel rotation axis, and
the trailing edge being rearward and upward of the idler wheel rotation axis.

2. The snowmobile of claim 1, wherein the leading edge is upward and forward of the trailing edge.

3. The snowmobile of claim 1, wherein an angle between the leading edge and the trailing edge about the idler wheel rotation axis is less than 90 degrees.

4. The snowmobile of claim 3, wherein the angle is less than 45 degrees.

5. The snowmobile of claim 1, wherein:
the deflector has an inner arcuate surface and an outer surface;
the inner arcuate surface faces the endless drive track; and
the idler wheel rotation axis extends through a center of curvature of the inner arcuate surface.

6. The snowmobile of claim 1, wherein the deflector has a width that is greater than a width of the endless drive track.

7. The snowmobile of claim 6, the width of the deflector is greater than a width of a rear end of the tunnel.

8. The snowmobile of claim 1, wherein:
the at least one rear idler wheel is a rear left idler wheel and a rear right idler wheel;
the suspension assembly has a left slide rail and a right slide rail;
the rear left idler wheel is rotationally connected to the left slide rail;
the rear right idler wheel is rotationally connected to the right slide rail; and
the left arm connects the deflector to the left slide rail and the right arm connects the deflector to the right slide rail.

9. The snowmobile of claim 8, wherein:
the left slide rail is laterally between the left arm and the rear left idler wheel; and
the right slide rail is laterally between the right arm and the rear right idler wheel.

10. The snowmobile of claim 8, wherein:
the suspension assembly has an axle connected between the left slide rail and the right slide rail;
the rear left idler wheel is rotationally connected to the axle;
the rear right idler wheel is rotationally connected to the axle;
the left arm is connected to the axle; and
the right arm is connected to the axle.

11. The snowmobile of claim 10, wherein:
the suspension assembly has a left track tensioner connected between the axle and the left slide rail and a right track tensioner connected between the axle and the right slide rail; and
the left and right track tensioners adjust a longitudinal position of the left and right rear idler wheels and of the snow guard, the snow guard moving longitudinally with the left and right idler wheels.

12. The snowmobile of claim 11, wherein:
each of the left and right arms defines a slot;
a left pin is connected to the left slide rail and is received in the slot of the left arm; and
a right pin is connected to the right slide rail and is received in the slot of the right arm.

13. The snowmobile of claim 1, wherein front portions of the left and right arms are disposed laterally inward of lateral edges of the endless drive track.

14. The snowmobile of claim 1, wherein the snow guard has:
a left snow scraper extending from the left arm toward an inner surface of the endless driver track; and
a right snow scraper extending from the right arm toward the inner surface of the endless driver track.

15. The snowmobile of claim 1, wherein the deflector is disposed rearward of a rear end of the tunnel.

16. The snowmobile of claim 15, further comprising a bumper connected to a rear portion of the tunnel; and
wherein the deflector is disposed rearward of a rear end of the bumper.

17. The snowmobile of claim 1, wherein:
the tunnel has a heat exchanger assembly; and
the deflector has a width that is greater than a width of a rear portion of the heat exchanger assembly.

18. The snowmobile of claim 1, wherein the at least one idler wheel and the snow guard move together relative to the tunnel as the rear suspension assembly extends and compresses.

19. A snowmobile comprising:
a frame having a tunnel;
at least one ski operatively connected to the frame;
a motor supported by the frame;
an endless drive track disposed at least in part below the tunnel and operatively connected to the motor for propulsion of the snowmobile, the endless drive track having a plurality of external lugs having a lug height;
a suspension assembly operatively connected to the frame, the suspension assembly supporting and tensioning the endless drive track, the suspension assembly having a least one rear idler wheel, the at least one idler wheel defining an idler wheel rotation axis; and a snow guard connected to the suspension assembly, the snow guard having a deflector, the deflector having a leading edge and a trailing edge, the leading edge being rearward and upward of the idler wheel rotation axis, the trailing edge being rearward and upward of the idler wheel rotation axis, the deflector having an inner arcuate surface and an outer surface, the inner arcuate surface facing the endless drive track, a distance between the at least one rear idler wheel and the inner arcuate surface being greater than the lug height, a gap being defined between the inner arcuate surface and an end of an external lug of the plurality of external lugs that is disposed between the inner arcuate surface and the at least one idler wheel, and the gap being smaller than the lug height.

20. The snowmobile of claim 19, wherein the leading edge is upward and forward of the trailing edge.

21. The snowmobile of claim 19, wherein an angle between the leading edge and the trailing edge about the idler wheel rotation axis is less than 90 degrees.

22. The snowmobile of claim 19, wherein the deflector has a width that is greater than a width of the endless drive track.

23. The snowmobile of claim 19, wherein the at least one idler wheel and the snow guard move together relative to the tunnel as the rear suspension assembly extends and compresses.

24. A snowmobile comprising:

a frame having a tunnel;

at least one ski operatively connected to the frame;

a motor supported by the frame;

an endless drive track disposed at least in part below the tunnel and operatively connected to the motor for propulsion of the snowmobile;

a suspension assembly operatively connected to the frame, the suspension assembly supporting and tensioning the endless drive track, the suspension assembly having a least one rear idler wheel, the at least one idler wheel defining an idler wheel rotation axis; and a snow guard connected to the suspension assembly, the snow guard having a deflector, the deflector having a leading edge and a trailing edge, the leading edge being rearward and upward of the idler wheel rotation axis, the trailing edge being rearward and upward of the idler wheel rotation axis, the deflector having an inner arcuate surface and an outer surface, the inner arcuate surface facing the endless drive track, a line tangent to the inner arcuate surface at the leading edge of the deflector does not intersect the endless drive track, and the line intersecting the tunnel forward of a rear end of the tunnel.

25. The snowmobile of claim 24, wherein:

the tunnel has a heat exchanger assembly; and the line intersects the heat exchanger assembly.

26. The snowmobile of claim 24, wherein the leading edge is upward and forward of the trailing edge.

27. The snowmobile of claim 24, wherein an angle between the leading edge and the trailing edge about the idler wheel rotation axis is less than 90 degrees.

28. The snowmobile of claim 24, wherein the deflector has a width that is greater than a width of the endless drive track.

29. The snowmobile of claim 24, wherein the at least one idler wheel and the snow guard move together relative to the tunnel as the rear suspension assembly extends and compresses.

\* \* \* \* \*

UNITED STATES PATENT AND TRADEMARK OFFICE
CERTIFICATE OF CORRECTION

PATENT NO. : 10,479,448 B2
APPLICATION NO. : 15/705490
DATED : November 19, 2019
INVENTOR(S) : Janne Tapio It is certified that error appears in the above-identified patent and that said Letters Patent is hereby corrected as shown below:

In the Claims

In Claim 1, Column 11, Line 31, "having a least one rear" should read --having at least one rear--

In Claim 7, Column 11, Line 59, "the width of the deflector" should read --wherein the width of the deflector--

In Claim 19, Column 13, Line 2, "having a least one rear" should read --having at least one rear--

In Claim 24, Column 14, Line 4, "having a least one rear" should read --having at least one rear--

Signed and Sealed this
Twenty-seventh Day of October, 2020

Andrei Iancu
*Director of the United States Patent and Trademark Office*